United States Patent
Baur et al.

(10) Patent No.: US 7,967,029 B2
(45) Date of Patent: Jun. 28, 2011

(54) DUCT OPTIMIZATION TO PREVENT FREEZING

(75) Inventors: Thomas Baur, Weilheim (DE); Thomas Winkeler, Deizisau (DE); Peter Riedel, Esslingen (DE)

(73) Assignee: Daimler AG, Stuttgart (DE)

( * ) Notice: Subject to any disclaimer, the term of this patent is extended or adjusted under 35 U.S.C. 154(b) by 71 days.

(21) Appl. No.: 12/443,995

(22) PCT Filed: Sep. 7, 2007

(86) PCT No.: PCT/EP2007/007809
§ 371 (c)(1),
(2), (4) Date: Apr. 2, 2009

(87) PCT Pub. No.: WO2008/040433
PCT Pub. Date: Apr. 10, 2008

(65) Prior Publication Data
US 2010/0032042 A1 Feb. 11, 2010

(30) Foreign Application Priority Data
Oct. 5, 2006 (DE) .................. 10 2006 047 574

(51) Int. Cl.
*F16L 55/04* (2006.01)
(52) U.S. Cl. .............. 138/27; 138/98; 138/32; 138/33
(58) Field of Classification Search ............ 138/27, 138/33, 34, 98
See application file for complete search history.

(56) References Cited

U.S. PATENT DOCUMENTS

| | | | | |
|---|---|---|---|---|
| 4,874,925 | A | | 10/1989 | Dickenson |
| 5,058,627 | A | * | 10/1991 | Brannen .................. 138/27 |
| 6,119,729 | A | * | 9/2000 | Oberholzer et al. .......... 138/27 |
| 6,338,364 | B1 | * | 1/2002 | Mendenhall ................ 138/32 |
| 6,615,875 | B2 | * | 9/2003 | Adolphs et al. ............. 138/98 |
| 6,794,076 | B2 | | 9/2004 | Busenbender |
| 2003/0068543 | A1 | | 4/2003 | Yasuo et al. |
| 2006/0159791 | A1 | * | 7/2006 | Kamiyama et al. .......... 425/11 |
| 2007/0072049 | A1 | | 3/2007 | Sadamoto |

FOREIGN PATENT DOCUMENTS

| | | |
|---|---|---|
| DE | 31 29 836 C1 | 3/1983 |
| DE | 100 63 254 A1 | 7/2002 |
| EP | 0 548 417 A1 | 6/1993 |
| EP | 0 929 112 A2 | 7/1999 |
| GB | 1026162 | 4/1986 |

OTHER PUBLICATIONS

International Search Report dated Dec. 27, 2007 (Three (3) pages).

\* cited by examiner

*Primary Examiner* — Patrick F Brinson
(74) *Attorney, Agent, or Firm* — Crowell & Moring LLP

(57) ABSTRACT

In a device for conveying liquids or moist gases through a closed duct in a vehicle fuel cell power systems, freezing of the duct is prevented by providing a part of its internal wall flow passages or flow chambers with a nonwoven material. The nonwoven material absorbs liquid in disperse form at low temperatures through its capillary action and inhibits premature ice formation.

11 Claims, 2 Drawing Sheets

DUCT OPTIMIZATION TO PREVENT FREEZING

This application is a national stage of PCT International Application No. PCT/EP2007/007809, filed Sep. 7, 2007, which claims priority under 35 U.S.C. §119 to German Patent Application No. 10 2006 047 574.7, filed Oct. 5, 2006, the entire disclosure of which is herein expressly incorporated by reference.

BACKGROUND AND SUMMARY OF THE INVENTION

The invention relates to a fluid flow device for the passage of liquids or moist gases, having a structure which substantially prevents freezing (and thus blockage) of the duct. Such devices are used in vehicle construction, particularly in modern fuel cell power systems, to broaden the operating temperature range of such power systems. As in conventional internal combustion engines, a particularly critical factor for fuel cell systems is the cold start phase, in which no process heat is as yet available to the main units for thawing purposes.

German patent document DE 3129836 C1 discloses a method of introducing a capillary structure (such as, for example, a stainless steel network) onto the inside of a long, internally smooth pipe, in order to distribute liquid evenly over the internal circumference of the pipe by capillary forces. By making use of the capillary action, the freezing point may be kept somewhat lower, thereby delaying freezing up of the ducts.

German patent document DE 10063254 A1 also discloses a device for keeping ducts open by distributing liquid water via capillary forces. To this end, a porous coating (for example, aluminosilicate or zeolite) is applied to the inside of the pipe; the coating absorbs water in disperse form at lower temperatures and releases the water again at least in part at higher temperatures. Such coatings, which absorb water in disperse form at low temperatures in order to prevent the formation of water droplets and the coalescence of water droplets into larger water quantities, have only a limited capacity for liquid absorption, however.

Against this background, one object of the present invention is therefore to provide a device for passing a flow of liquids or moist gases which largely prevents freezing and thus blocking of the duct.

Another object of the invention is to provide a fluid flow device which straightforwardly enables trouble-free operation to be established at sub-zero temperatures, without allowing deposited water (and water accumulated into larger quantities) to prevent operation of the fuel cell power systems due to freezing, or even to damaging the device as a result of frost.

These and other objects and advantages are achieved by the flow passage structure according to the invention, in which a nonwoven provided on at least part of the internal wall flow passages or flow chambers absorbs liquid in disperse form at low temperatures. Thus, the invention is based on the recognition that capillary, spatial structures exist which absorb liquids in disperse form at relatively low temperatures. It thereby prevents (or at least impedes) the formation of water droplets, for example, and the coalescence of larger liquid accumulations, which may then freeze to form a coherent, block-forming structure. Even if freezing were to occur, ice formation would be restricted by the nonwoven to just local, individual crystal nuclei, so preventing frost damage.

In a further advantageous embodiment of the flow passage device according to the invention, the nonwoven is made of stainless steel. In this way, probable contamination caused by unintentional corrosion or even material detachment, which could lead to a malfunction of or even damage to the fuel cell power system, is largely avoided even with large temperature bandwidths.

In a further advantageous embodiment, the nonwoven is of multi-ply construction. In this way, functional differentiation between the different plies of the nonwoven is possible.

The multi-ply nature of the nonwoven is as follows:

The nonwoven with a supporting function is directed with a coarse mesh structure towards the wall-side duct surface. This ply has the function of keeping the complete nonwoven composite in shape statically in the duct, while providing the stability necessary for fitting during the insertion process.

The nonwoven with a capillary action is directed with a fine mesh structure towards the middle of the duct, and is thus in direct contact with the liquid or the moist gases of the fuel cell process. With the static support provided by the nonwoven structure with the coarse mesh structure, the functional purpose of the nonwoven ply with the fine mesh structure is to make the pores of the surface structure so small that condensing liquid is absorbed in a virtually capillary manner. Accordingly, no larger liquid accumulations, which could freeze and lead to blocking of the fuel cell system, are able to remain on the surface of the nonwoven.

In a further advantageous embodiment of the nonwoven plies, the nonwoven is coated with a fine mesh structure with special chemicals to prevent condensate formation. Aluminum silicates and polymers with acid or alkali residues have proven to be practical coatings. Such hydrophilic coatings, with their chemical affinity for water, also reduce the surface tension of the liquid, so in turn preventing relatively large liquid accumulations which could freeze and lead to blockage of the fuel cell system.

If, at extremely low temperatures, neither the previously described physical capillary action nor the chemical hydrophilic action of the nonwoven coating can prevent freezing, a heating conductor is built in to keep the duct and the nonwoven fabric clear. Such a heating conductor with electrical heating wires is advantageously incorporated into the supporting, coarse mesh structure of the nonwoven ply on the wall side. In a further embodiment, the nonwoven ply on the wall side may itself be of two-ply construction and the heating conductor may be pressed or adhesively bonded between the two plies of the wall-side nonwoven ply. The heating conductor is only in operation until the process heat from the fuel cell power system prevents freezing, so as not to load the vehicle electrics unnecessarily.

In an advantageous method of filling the closed duct with the nonwoven or nonwoven composite, the nonwoven is inserted into the closed duct in a rolled-up state, and is unrolled only when it is finally located at the point in the duct necessary for functioning. The rolled-up nonwoven may be drawn through, for example, using the heating element terminal wires previously drawn through the duct.

Other objects, advantages and novel features of the present invention will become apparent from the following detailed description of the invention when considered in conjunction with the accompanying drawings.

DETAILED DESCRIPTION OF THE DRAWINGS

Figures 1, 2:
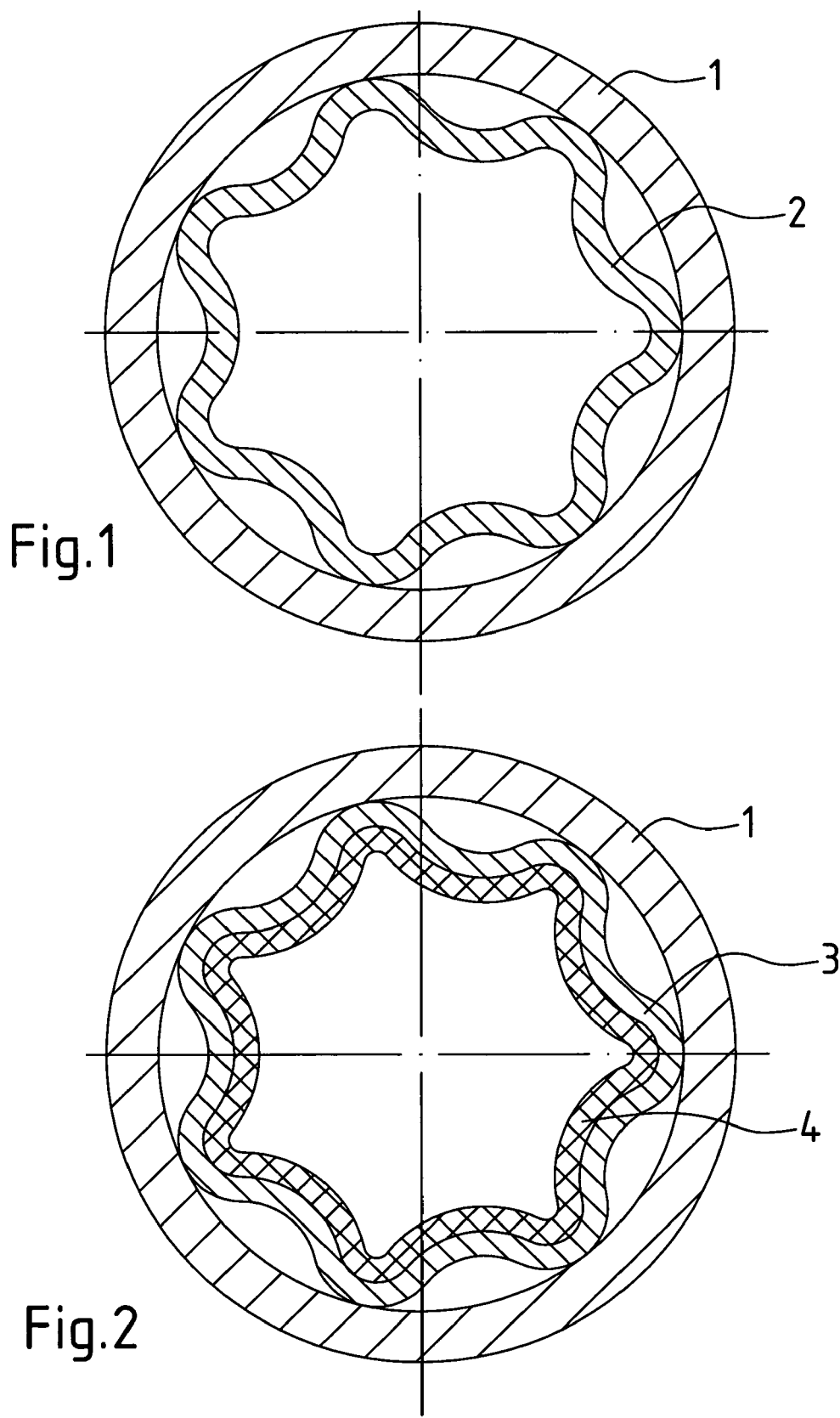
FIG. 1 shows a duct with nonwoven according to the invention.
FIG. 2 shows a duct with two-ply nonwoven composite.

FIG. 1 shows a cross-section through a duct 1 for the passage of liquids or moist gases, with a nonwoven 2 of stainless steel. The nonwoven 2 lies, in places, against the internal wall of the duct 1.

FIG. 2 shows a cross-section through a duct 1 for the passage of liquids or moist gases with a two-ply nonwoven composite. A nonwoven with a supporting function, and having a coarse mesh structure 3, is directed towards the wall-side duct surface 1; while a nonwoven with a capillary action, and having a fine mesh structure 4, is directed towards the middle of the duct. Thus, the latter being in direct contact with the liquid or the moist gases.

Figure 3:
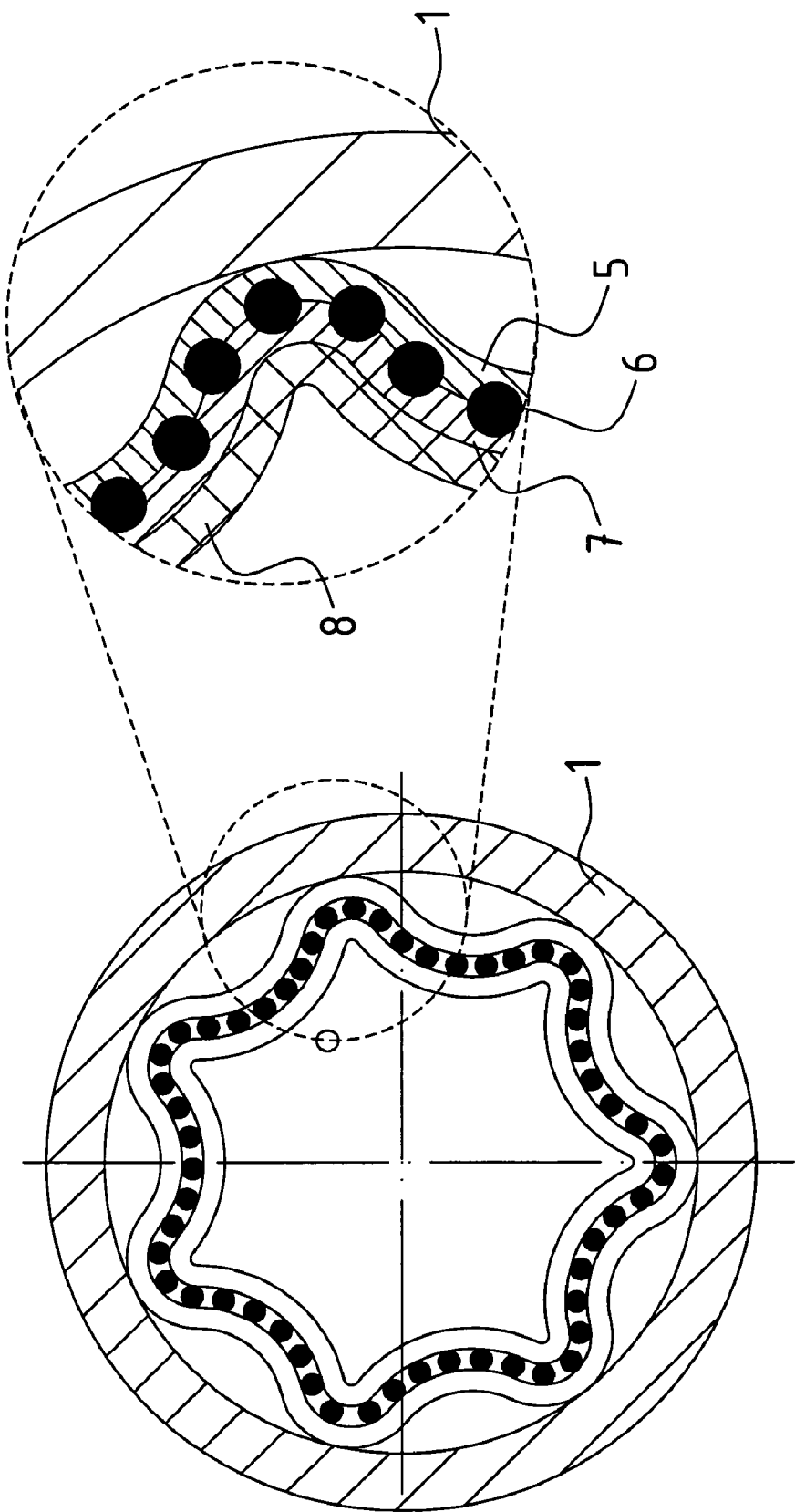
FIG. 3 shows a duct with three-ply nonwoven composite.

FIG. 3 shows a cross-section through a duct 1 for the passage of liquids or moist gases with a three-ply nonwoven composite that includes a nonwoven ply of two-ply construction with a supporting function having a coarse mesh structure with an outer layer 5 directed towards the wall-side duct surface 1, and an inner layer 7. Heating wires 6 of the heating element are placed between these two supporting nonwoven plies. The nonwoven with a capillary action is arranged on the inner layer 7 of the nonwoven of two-ply construction with a supporting function, so that the fine mesh structure 8 is directed toward the middle of the duct, in direct contact with the liquid or the moist gases.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for the passage of liquids or moist gases, comprising:
    a closed duct; and
    a nonwoven fabric which is disposed at least in part on an internal wall of flow passages or flow chambers of said duct, and has a mesh structure which absorbs liquid in disperse form at low temperatures.

2. A device for the passage of liquids or moist gases, comprising:
    a closed duct; and
    a nonwoven fabric which is disposed at least in part on internal wall flow passages or flow chambers of said duct, and which absorbs liquid in disperse form at low temperatures;
    wherein the nonwoven material is of multi-ply construction.

3. The device as claimed in claim 2, wherein the nonwoven is made of stainless steel.

4. The device as claimed in claim 2, wherein:
    at least one ply of the nonwoven material has a coarse mesh structure and performs a supporting function; and
    at least one ply of the nonwoven material has a fine mesh structure and performs a capillary action.

5. The device as claimed in claim 4, wherein:
    the ply with a coarse mesh structure is directed towards the wall-side duct surface; and
    the ply with a fine mesh structure is directed towards the middle of the duct.

6. The device as claimed in claim 4, wherein the nonwoven ply with a fine mesh structure has a coating that prevents condensate formation.

7. The device as claimed in claim 6, wherein the coating on the fine mesh structure comprises aluminum silicate.

8. The device as claimed in claim 6, wherein the coating on the fine mesh structure comprises a polymer with acid or alkali residues.

9. A device for the passage of liquids or moist gases, comprising:
    a closed duct;
    a nonwoven material which is disposed at least in part on internal wall flow passages or flow chambers of said duct, and which absorbs liquid in disperse form at low temperatures; and
    an element for heating the nonwoven material at least in places.

10. The device as claimed in claim 9, wherein the nonwoven ply with a coarse, supporting mesh structure is constructed at least in places as a heating conductor.

11. A method of installing a nonwoven material into a closed duct for conveying a fluid flow, said method comprising:
    inserting the nonwoven material in a rolled-up state into the closed duct; and
    unrolling the nonwoven material when it is located at a point necessary for functioning to absorb liquid in disperse form at low temperatures within the closed duct.

* * * * *